US011663499B2

(12) United States Patent
Yin et al.

(10) Patent No.: US 11,663,499 B2
(45) Date of Patent: May 30, 2023

(54) METHOD, DATA PROCESSING APPARATUS AND COMPUTER PROGRAM PRODUCT FOR DETERMINING ROAD INTERSECTIONS

(71) Applicant: GRABTAXI HOLDINGS PTE. LTD., Singapore (SG)

(72) Inventors: Yifang Yin, Singapore (SG); Jagannadan Varadarajan, Singapore (SG); Abhinav Sunderrajan, Singapore (SG); Roger Zimmermann, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 0 days.

(21) Appl. No.: 17/611,097

(22) PCT Filed: Oct. 10, 2019

(86) PCT No.: PCT/SG2019/050507
§ 371 (c)(1),
(2) Date: Nov. 12, 2021

(87) PCT Pub. No.: WO2021/071422
PCT Pub. Date: Apr. 15, 2021

(65) Prior Publication Data
US 2022/0230450 A1 Jul. 21, 2022

(51) Int. Cl.
*G06N 5/02* (2023.01)
*G06V 20/58* (2022.01)
(Continued)

(52) U.S. Cl.
CPC ......... *G06N 5/02* (2013.01); *G06F 18/24137* (2023.01); *G06N 3/045* (2023.01);
(Continued)

(58) Field of Classification Search
CPC ........ G06N 3/0454; G06N 3/084; G06N 3/08; G06T 2207/20084; G06T 2207/20081; G06T 7/11
See application file for complete search history.

(56) References Cited

U.S. PATENT DOCUMENTS

2019/0108639 A1* 4/2019 Tchapmi ................ G06V 20/64

FOREIGN PATENT DOCUMENTS

| CN | 103609178 | 2/2014 |
|---|---|---|
| CN | 106547880 | 3/2017 |

(Continued)

OTHER PUBLICATIONS

Fathi, Alireza & Krumm, John. (2010). Detecting Road Intersections from GPS Traces. 6292. 56-69. 10.1007/978-3-642-15300-6_5. (Year: 2010).*

(Continued)

*Primary Examiner* — Ross Varndell
(74) *Attorney, Agent, or Firm* — Nixon Peabody LLP; Jeffrey L. Costellia

(57) ABSTRACT

A method, data processing apparatus, and computer code for identifying road intersections includes providing location data obtained from at least one vehicle's trajectory, wherein the location data may include geographical data within a geographical perimeter. The method includes determining node vectors by applying a geographical descriptor model on a target location included in the geographical perimeter. The geographical descriptor model includes a plurality of multiscale node descriptors including a target multiscale descriptor and neighboring multiscale descriptors. Each of the plurality of multiscale node descriptors includes at least two shape descriptors of different geographical resolution. Each of the neighboring locations is at a respective geographical distance from the target location. The node vectors (Continued)

may be respectively determined for each of the plurality of multiscale node descriptors. The method includes inputting the node vectors into a trained multiscale classifier including a graph convolutional network to provide a probability of the target location being a road intersection.

20 Claims, 6 Drawing Sheets

(51) Int. Cl.
    *G06V 10/82*     (2022.01)
    *G06F 18/2413*     (2023.01)
    *G06N 3/045*     (2023.01)
    *G06N 3/048*     (2023.01)
    *G06V 20/56*     (2022.01)

(52) U.S. Cl.
    CPC ............. *G06N 3/048* (2023.01); *G06V 10/82* (2022.01); *G06V 20/56* (2022.01); *G06V 20/582* (2022.01); *G06V 20/584* (2022.01)

(56) References Cited

FOREIGN PATENT DOCUMENTS

| | | |
|---|---|---|
| CN | 105355042 | 9/2017 |
| CN | 105788273 | 3/2018 |
| CN | 108877267 | 11/2018 |
| CN | 109815993 | 5/2019 |
| CN | 109993134 | 7/2019 |
| CN | 110175574 | 8/2019 |

OTHER PUBLICATIONS

B. Xiang, J. Tu, J. Yao and L. Li, "A Novel Octree-Based 3-D Fully Convolutional Neural Network for Point Cloud Classification in Road Environment," in IEEE Transactions on Geoscience and Remote Sensing, vol. 57, No. 10, pp. 7799-7818, Oct. 2019, doi: 10.1109/TGRS.2019.2916625. (Year: 2019).*

Nassar, "Hierarchical Bipartite Graph Convolution Networks," Dec. 13, 2018. (Year: 2018).*

Li, L. et al.; "Extraction of Road Intersections from GPS Traces Based on the Dominant Orientations of Roads", International Journal of Geo-Information; 2017, 6, 403; 16 pp.

Fathi, A. et al., "Detecting Road Intersections from GPS Traces", Sixth International Conference on Geographic Information Science, Sep. 14- 17, 2010; 14 pp., Zurich.

Chen, C. et al., "City-Scale Map Creation and Updating using GPS Collections", KDD '16, Aug. 13-17, 2016; 10 pp., San Francisco, Ca, USA.

Cordonnier, J.-B. et al., "Extrapolating paths with graph neural networks", Mar. 18, 2019; arXiv: 1903.07518vl; 13 pp.

Hong, Z. et al., "Road Extraction From a High Spatial Resolution Remote Sensing Image Based on Richer Convolutional Features", IEEE Access, 2018, vol. 6, pp. 46988-47000.

Péteri, R. et al., "Detection and extraction of road networks from high resolution satellite images", IEEE International Conference on Image Processing, 2003, Barcelona, Spain; 5 pp.

Yi, W. et al., "Experimental Research On Urban Road Extraction From High-Resolution RS Images Using Probabitistic Topic Models", 2010, IEEE; pp. 445-448.

International Preliminary Report on Patentability in Application No. PCTSG2019050507 dated Dec. 29, 2020, 10 pp.

International Search Report in Application No. PCTSG2019050507 dated Dec. 12, 2019, 4 pp.

International Written Opinion in Application No. PCTSG2019050507 dated Dec. 12, 2019, 4 pp.

Notification of First Office Action for Chinese Patent Application No. CN-201980096507.2, dated May 11, 2022, 6 pp.

\* cited by examiner

US 11,663,499 B2

METHOD, DATA PROCESSING APPARATUS AND COMPUTER PROGRAM PRODUCT FOR DETERMINING ROAD INTERSECTIONS

TECHNICAL FIELD

Various embodiments relate to a method for determining if a geographical coordinate has a road intersection, thus identifying road intersections. Various embodiments relate to a data processing apparatus configured to carry out said method for identifying road intersections. Various embodiments relate to a non-transitory computer-readable medium storing computer executable code including instructions for identifying road intersections. Various embodiments relate to a computer executable code including instructions for identifying road intersections. Various embodiments relate to a method for training a classifier for determining if a target location may be a road intersection.

BACKGROUND

Automatic intersection detection has been a critical research problem for a variety of artificial intelligence and location based services applications. Due to the ubiquity of sensor-equipped smartphones, it has become common for drivers to report their locations (for example, GPS data) via smartphone apps for passenger matching and accident detection, etc. This motivates the utilization of large-scale GPS trajectories for intersection detection, which has gained increasing research interest in recent years. Based on the methodologies, earlier work can be roughly divided into two categories: heuristic methods and machine learning based methods. Heuristic methods define intersections as locations where the drivers change their moving directions or locations that connect more than two road segments. Machine learning based methods first extract features as location descriptors, and next train a classifier based on the extracted features to determine if an input location is a road intersection or not.

SUMMARY

An aspect of the disclosure relates to various embodiments of a method for identifying road intersections. The method may include: a) providing location data obtained from at least one vehicle's trajectory. The location data may include geographical data, for example GPS data, within a geographical perimeter. The method may further include: b) determining node vectors by applying a geographical descriptor model on a target location included in the geographical perimeter. The geographical descriptor model may include a plurality of multiscale node descriptors including a target multiscale descriptor for the target location and neighboring multiscale descriptors for neighboring locations. Each of the plurality of multiscale node descriptors may include at least two shape descriptors of different geographical resolution. Each of the neighboring locations may be at a respective geographical distance from the target location. The node vectors may be respectively determined for each of the plurality of multiscale node descriptors. The method may further include: c) inputting the node vectors into a trained multiscale classifier including a graph convolutional network to provide a probability of the target location being a road intersection.

Another aspect of the disclosure relates to various embodiments of a data processing apparatus configured to carry out the method of identifying road intersections.

Another aspect of the disclosure relates to various embodiments of a non-transitory computer-readable medium storing computer executable code including instructions for the method of identifying road intersections.

Another aspect of the disclosure relates to various embodiments of a computer executable code including instructions carrying out the method of identifying road intersections.

Another aspect of the disclosure relates to various embodiments of a method for training a classifier for determining if a target location may be a road intersection. Once trained, the classifier may be used in the previously mentioned aspects and in various embodiments as the trained multiscale classifier. The method may include performing forward propagation by inputting training data into a classifying logic to obtain an output result, for a plurality of target locations of a geographical perimeter. The training data may include location data obtained from at least one vehicle's trajectory. The location data may include geographical data within the geographical perimeter. The training data may further include intersection presence data for each target location of a plurality of target locations, for example, indicating whether a target location corresponds to a road intersection or to a non-intersection. The method may further include performing back propagation according to a difference between the output result and the known intersection presence data to adjust weights of the classifying logic. The method may further include repeating the above steps until a pre-determined convergence threshold may be achieved. The classifying logic may be as explained herein in connection with various embodiments. For example, the classifying logic may include the classifier including a graph convolutional network. The classifier may further include a pre-processing logic for determining node vectors by applying a geographical descriptor model on a target location included in the geographical perimeter. The geographical descriptor model may include a plurality of multiscale node descriptors including a target multiscale descriptor for the target location and neighboring multiscale descriptors for neighboring locations. Each of the plurality of multiscale descriptors may include at least two shape descriptors of different geographical resolution. Each of the neighboring locations may be at a respective geographical distance from the target location. The node vectors may be respectively determined for each of the plurality of multiscale node descriptors.

BRIEF DESCRIPTION OF THE DRAWINGS

The invention will be better understood with reference to the detailed description when considered in conjunction with the non-limiting examples and the accompanying drawings, in which:

FIG. 7 further shows, on the right side, one trajectory 61, selected out of the location data, crossing an inner circle 63 of the shape descriptor 60; FIG. 10 shows a diagram of an exemplary process for fusing multi-scale graph representation vectors $\{\tilde{Z}_k^1, \tilde{Z}_k^2, \ldots \tilde{Z}_k^m\}$ output by the graph convolutional network.

DETAILED DESCRIPTION

Figure 1:
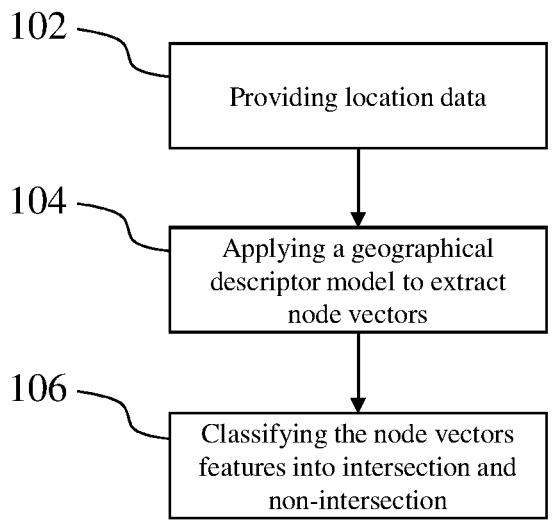
FIGS. 1-3 show schematic representations of the method for determining if a geographical coordinate has a road intersection, thus identifying road intersections, in accordance with various embodiments.

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Embodiments described in the context of one of the method for identifying road intersections, the data processing apparatus, the non-transitory computer-readable medium storing computer executable code, the computer executable code, and the method for training the classifier are analogously valid for the other non-transitory computer-readable medium storing computer executable code, the computer executable code, or the method for training the classifier.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

As used herein, the term "and/or" includes any and all combinations of one or more of the associated listed items.

As used herein and in accordance with various embodiments, the expression "road intersection" or simply "intersection", may mean a road junction, of example an orthogonal crossing of two roads, a non-orthogonal crossing of two roads, a bifurcation.

As used herein and in accordance with various embodiments, the expression of determining if a location is a road intersection may be referred to as identifying a road intersection.

As used herein and in accordance with various embodiments, the expression "method for" may also include the meaning of "method of".

As used herein and in accordance with various embodiments, the expressions "node feature" and "node vector" (and its plural forms) may be used interchangeably.

As used herein and in accordance with various embodiments, the term location data may include geographical data, such as geospatial coordinate and may further include time, for example, as provided by the global positioning system GPS. The GPS coordinates may according to the World Geodetic System, WGS 84, for example, version G1674.

For the identification of road intersections, the location data is real world data, for example real world GPS data. Correspondently, the geographical perimeter represents a perimeter on earth's surface.

As used herein and in accordance with various embodiments, the terms 'geographical' and 'geospatial' may be used interchangeably.

The service of ride-hailing providers relies significantly on the quality of the digital map. The missing of a road intersection or a road segment from the map can lead to suboptimal routing decision or inaccurate estimation of a driver's arrival time. Though OpenStreetMap (OSM) provides the community user-generated maps of the world, its data completeness and accuracy vary significantly in different cities. Considering the high cost of manual corrections of map data, using data automation may provide advantages for providing accurate maps. For example, data-driven approaches can learn from cities with relatively higher quality map data (e.g., Singapore) to automatically discover missing roads and intersections in cities with relatively poorer map data (e.g., Jakarta). To this end, various embodiments of the present disclosure use a multi-scale graph convolutional network that can effectively detect intersections from large-scale GPS trajectories.

FIG. 1 shows a schematic representations of a method 100 for determining if a geographical coordinate (for example, a target location) has a road intersection, thus identifying road intersections, in accordance with various embodiments. The method 100 for identifying road intersections may include steps 102, 104, and 106. Step 102 (also referred to as step a)) may include providing location data 20 obtained from at least one vehicle's trajectory 21, 22. The location data may include geographical data 10 within a geographical perimeter 12. Step 104 (also referred to as step b)) may include determining node vectors by applying a geographical descriptor model 600 on a target location 14 included in the geographical perimeter 12. The geographical descriptor model 600 ($G_k^1$, $G_k^2$, ... $G_k^m$) may include a plurality of multiscale node descriptors $V_1, V_2, \ldots, V_n$, each including a target multiscale descriptor $V_1$ for the target location 14 and neighboring multiscale descriptors $V_2, V_3, \ldots, V_n$ for neighboring locations. The plurality of multiscale node descriptors $V_1, V_2, \ldots, V_n$ may include at least two shape descriptors of different geographical resolution. Each of the neighboring locations may be at a respective geographical distance from the target location 14. The node vectors may respectively be determined for each of the plurality of multiscale node descriptors $V_1, V_2, \ldots V_n$. The geographical descriptor model 600 will be explained in more details further below.

The method 100 may further include a step 106 (also referred to as step c)) of inputting the node vectors into a trained multiscale classifier including a graph convolutional network 700 to provide a probability of the target location 14 being a road intersection. According to various embodiments, the input in the graph convolutional network 700 is a matrix X and an adjacent matrix A. The adjacent matrix A captures the graph structure. According to various embodiments, in matrix X each row may represent a node vector (also named herein as node feature). The matrix X is also referred to as input graph. The matrix X and the adjacent matrix A may also be named as a graph-level representation.

According to various embodiments step c) may include applying a logistic regression, for example, comparing the probability with a pre-determined threshold. If the threshold is met, the target location is determined as a candidate location for a road intersection. For example the logistic regression may return a binary value, for example '1' when a road intersection is present and '0' when a road intersection is not present.

According to various embodiments, determining node vectors and inputting the node vectors into a trained multiscale classifier may be repeated for a plurality of target locations of the location data, to obtain a plurality of candidate locations determined for at least some of the respective plurality of target locations.

Figure 2:
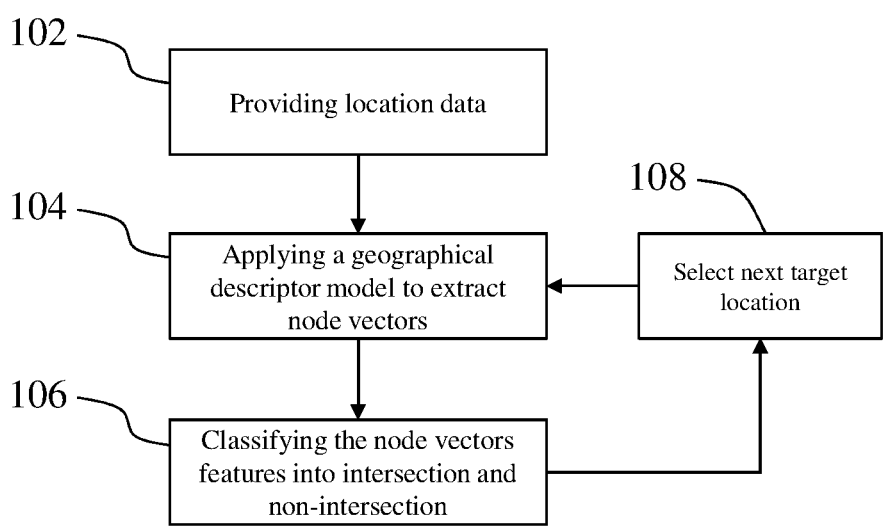
Figure 3:
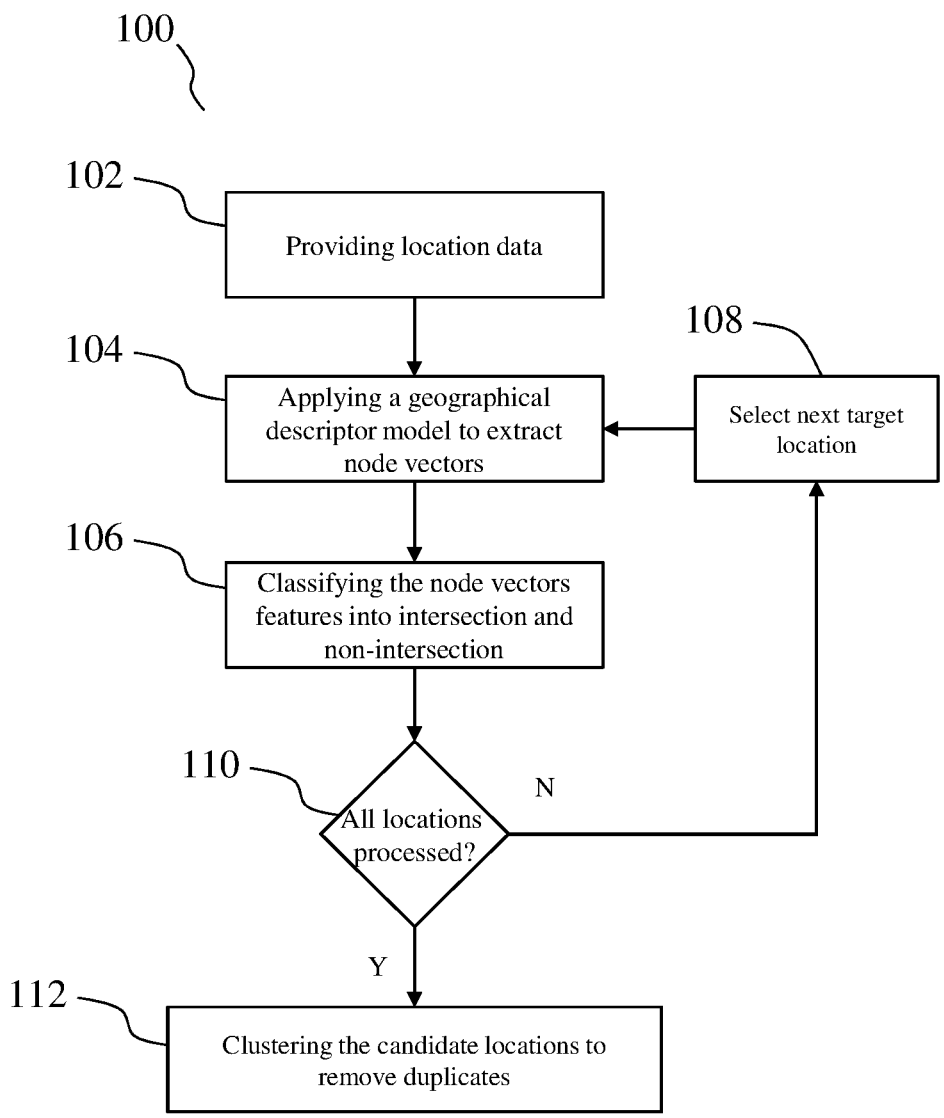

FIG. 2 shows a schematic representations of a method 100 for identifying road intersections identical of the method 100 shown in FIG. 1, except that it further includes a step 108 in which, after step 106 is carried out, a next target location is selected and the process returns to step 104 having the next target location as target location. The method 100 may proceed until all the desired target locations are processed, as shown in FIG. 3, wherein the method 100 exits the loop (steps 104→106→108→104) via decision node 110 when all locations are processed. The flowchart configurations are shown in FIGS. 2 and 3 for illustration purposes, and other variations thereof are possible, for example, the repetition may be provided in another manner.

According to various embodiments, the repetition may be carried out by shifting the geographical descriptor model to a next target location. For example, the current target location may be one location of the trajectory, and the next target location may be another, for example an adjacent, location of the trajectory. In some embodiments, the next target location may be a location of the trajectory which is within a geographical distance range from the current target location. Thus, locations recorded too close to each other, for example on a traffic jam, may be ignored, or pre-filtered. For example, the geographical distance range may have a lower end and an upper end. In embodiments, the lower end may be chosen from 10 meter to 30 meter and the upper end may be chosen from 20 meter to 60 meter. The upper end is larger than the lower end. In one example, the geographical distance range may be from 25 meter to 50 meter.

According to various embodiments the plurality of candidate locations may be clustered to remove duplicates into one or more detected intersections. For example, a cluster of candidate locations may be further processed to determine that a target point which is as road intersection. The further processing may be, e.g., determining the center of the cluster.

Various embodiments also concern a process for determining the presence of a road between two intersections. The process may include provide location data (e.g. as described herein in accordance with various embodiments) and intersections, for example identified intersections, as identified with the method for identifying intersections according to various embodiments. The process may further include calculating a mean of one or more trajectories between two detected intersections, to determine the presence of a road between the two detected intersections. The process for determining the presence of a road may be carried out after or as part of the method for identifying intersections.

According to various embodiments, the target location and the neighboring locations may form a grid pattern centered on the target location. Accordingly, the target multiscale descriptor ($V_1$) and the neighboring multiscale descriptors ($V_2$, $V_3$, . . . $V_n$) may be arranged in the grid pattern, for example having the target multiscale descriptor ($V_1$) centered at the target location. In some embodiments, the neighboring locations are 8, for example arranged as a 3×3 matrix with the target location at the center. The distance between centers of vertical and horizontal adjacent multiscale descriptors may be a pre-determined angle in terms of latitude and longitude. In various embodiments, the distance may be chosen, e.g., from 50 meters to 100 meters. For example it may be set to 0.0005 degrees in terms of latitude and longitude, which is approximately 55 meters.

According to various embodiments, determining node vectors may include determining a location vector for each trajectory of the at least one vehicle's trajectory. The location vectors may be normalized, e.g. using the L1 norm. Alternatively or in addition, determining node vectors may include determining a moving direction vector for each trajectory of the at least one vehicle's trajectory. The moving direction vectors may be normalized, e.g. using the L1 norm.

According to various embodiments, when location and direction vectors are used, the method of identifying a road intersection may further include concatenating each of the location vectors with each of the respective moving direction vectors into concatenated vectors to be input into the trained multiscale classifier as the node vectors.

According to various embodiments each of the shape descriptors divides nearby regions of the target location into multiple histogram bins representing geographical subdivisions, for example each of the shape descriptor may include a circular shape divided in annuli, wherein each of the annuli may be split by a radial line into annular sections, each corresponding to a histogram bin.

According to various embodiments determining a location vector may include performing binning of a trajectory, for example, by adding one point (this point main be named a trajectory bin count) to each of the histogram bins that the trajectory passes through.

According to various embodiments, determining a moving direction vector may include, for a plurality of geographical angular rotations of the shape descriptor in a pre-determined geographical angular direction, performing binning of a moving direction of the location data of the trajectory, for example, by adding one point (this point main be named a moving direction count) to each of the histogram bins for which the location data of a trajectory may be a moving direction.

According to various embodiments, the method may include discarding trajectories which do not cross a pre-determined inner circle of the shape descriptor, for example a circle formed by the inner annuli, for reducing noise. The discarding may be carried out before or as part of any binning for determining the location or moving direction vector. Thus, the binning may be carried out for the trajectories which cross the pre-determined inner circle and may not be carried out for the trajectories which do not cross the pre-determined inner circle.

Training of the Classifier

Various embodiments also concerns the training of a multiscale classifier for determining if a target location may be a road intersection. For example, the trained classifier may be used in the method for identifying road intersections as the trained multiscale classifier.

The training data may include location data obtained from at least one vehicle's trajectory 21, 22, wherein the location data includes geographical data 10 within the geographical perimeter 12. The training data may further include intersection presence data for each target location of a plurality of target locations. For example a '1' when a road intersection is present and '0' when a road intersection is not present.

Training may be by supervised learning. In some embodiments, the training may be performed by forward propagation by inputting training data including intersection presence data into a classifying logic to obtain an output result, for a plurality of target locations of a geographical perimeter 12. An output result may be a probability (e.g. between 0 and 1). The training may further include performing back propagation according to a difference between the output result and the road intersection presence data to adjust weights of the classifying logic. Forward and backward propagation steps may be repeated until a pre-determined convergence threshold is achieved.

The classifier may also be validated with a validation data, and may further be tested with test data. Training data, validation data and test data (if used) may be different from each other to provide an unbiased evaluation of the trained classifier.

The classifying logic may include the multiscale classifier according to various embodiments. For example, the classifying logic may include a classifier including a graph convolutional network and a pre-processing logic for determining 104 node vectors by applying 104 the geographical descriptor model 600 on a target location 14 included in the geographical perimeter 12. The geographical descriptor model 600 ($G_k^1, G_k^2, \ldots G_k^m$) may include a plurality of multiscale node descriptors ($V_1, V_2, \ldots, V_n$) including a target multiscale descriptor $V_1$ for the target location 14 and neighboring multiscale descriptors $V_2, V_3, \ldots, V_n$ for neighboring locations. Each of the plurality of multiscale descriptors $V_2, V_3, \ldots, V_n$ may include at least two shape descriptors of different geographical resolution.

Shape Descriptor

Figure 4:
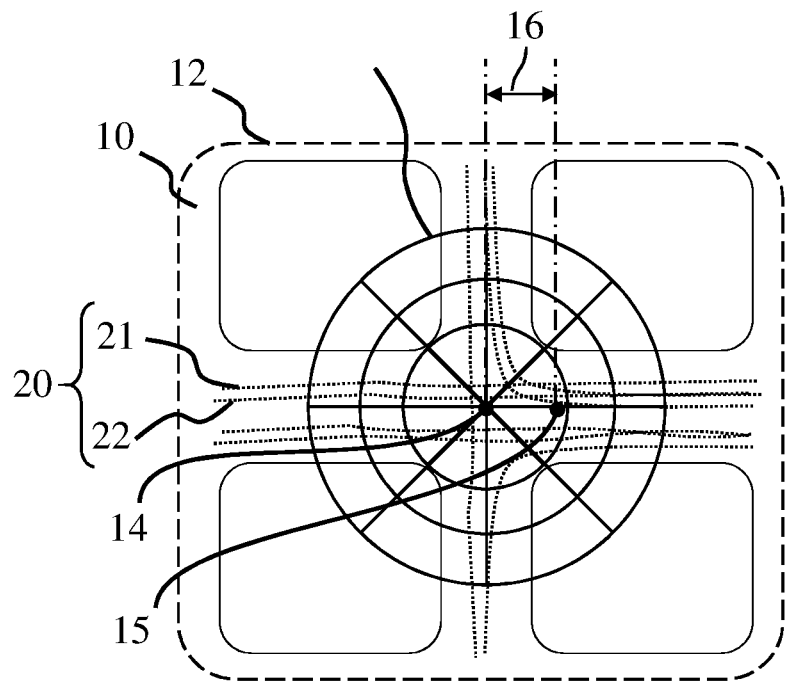
FIG. 4 shows a schematic representation of a geographical perimeter 12 including location data of vehicle trajectories 21 and 22, and a shape descriptors $V_1^1$.

FIG. 4 shows a schematic representation of a geographical perimeter 12 including geographical data 10 and location data 20 of vehicle trajectories, for example trajectories 21 and 22. The geographical data may be coordinates, such as latitudes, longitudes and elevations, for example in accordance with the WGS 84 (e.g. version G1674).

In FIG. 4, there are four blocks representing city blocks which are shown for ease of understanding, the city blocks are separated by roads, which are illustrated as a vertical road and a horizontal road crossing each other, and thereby forming a road intersection at the center of the figure. Also shown on the geographical perimeter 12 are several vehicle trajectories 20, for example trajectories 21 and 22. For example a trajectory may be curved, as the vehicle performed a turn at the road intersection. Trajectories may also be straight. Not shown are the directions of the trajectories, however, these can be easily determined by comparing time stamps of any two target locations, for example of two target locations, of the trajectory. In examples, time stamps may be provide for each target location. In other examples locations may be recorded at a fixed time interval, thus the time stamps may be provided for each target location or may be calculated.

Further on FIG. 4, a shape descriptor $V_1^1$, is shown is centered on the road intersection. Thus, in the illustrated case, the target location 14 is identifiable as a road intersection. As shown, and in accordance with various embodiments, a shape descriptor $V_1^1, V_1^2, \ldots, V_n^m$ may include concentrically annuli which may be segmented, for example by a constant angle (e.g. a divisor of 360 degrees), each segment represents a bin. The application of the shape descriptor will be explained further below.

The extraction of multiscale graph-level features (or simply named as graph-level features) including the node vectors, using shape descriptors with different sizes, and the use of the geographical descriptor model 600 as a graph representation, that models a location together with the local environment in the nearby regions, provides a robust model for identifying road intersections.

Graph convolutions may be performed inputting the geographical descriptor model 600, e.g., including the node vectors, into the trained multiscale classifier including a graph convolutional network 700. The graph convolutions effectively encode not only node features but also graph substructures (e.g., via the adjacent matrix A) to generate a robust multi-scale graph representation vector.

According to various embodiments, after encoding the node vectors with the graph convolutional network 700, the resulting output features may be concatenated into a multi-scale graph representation vector, from which a probability may be determined, and logistic regression may be applied to provide candidate locations for a road intersection.

According to various embodiments, the identification of intersections from recorded vehicle trajectories (e.g. GPS trajectories) may be provided by shifting the center of the geographical descriptor model 600 from one target location to another target location (for example from a current target location to a next target location), and considering the center for determining if it is a candidate location for a road intersection. One example of shifting is illustrated in FIG. 4, a shape descriptor (the center shape descriptor of the geographical descriptor model 600) is shown as centered on the target location 14 (the current target location), and may afterwards be shifted to the target location 15 (the next target location), by a geographical distance 16. The geographical descriptor model 600 centers for the target locations are considered to be candidate locations of road intersections if the probability predicted by the multiscale classifier is larger than a pre-defined threshold. The candidate locations may be clustered, and one representative candidate location may be selected from each cluster to remove duplicates, thereby identifying the intersection.

The present disclosure has several advantages. The disclosed geographical descriptor model is descriptive and robust as the method models not only the target location but also the corresponding local environment. The multi-scale graph convolutional network to identify road intersections, e.g. from GPS trajectories, can effectively learn from the disclosed geographical descriptor model without pre-estimating the scale and orientation at locations before feature extraction.

Modeling Geographical Locations as Graphs

Road junctions do not occur in isolation and their characteristics such as size and orientation can be closely related to the location environment. Based on this observation, a geographical descriptor model 600 in the form of a graph representation is proposed to represent a location and model the road intersection detection as a multi-graph classification problem.

Figure 5:
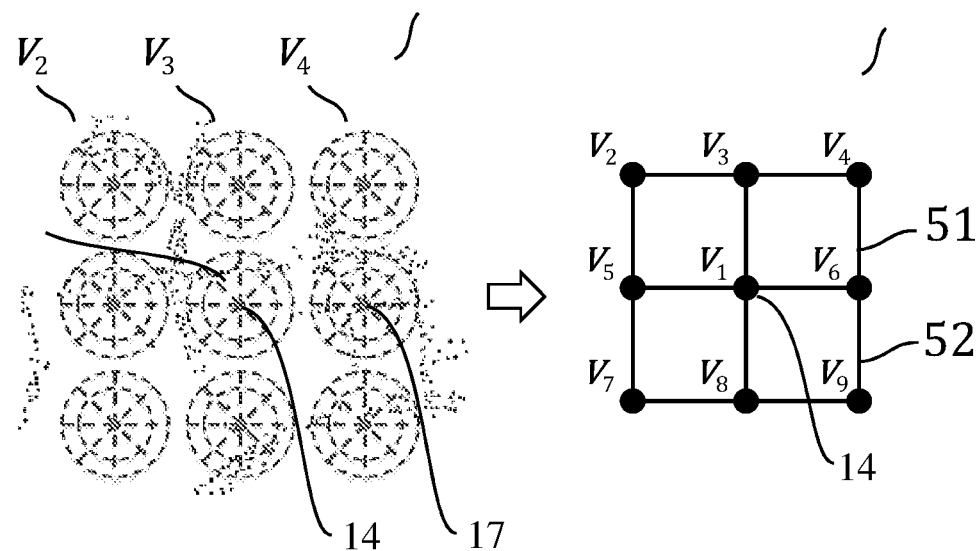
FIG. 5 shows a schematic representation of a geographical descriptor model 600 in the form of multiscale node descriptors $V_1, V_2, \ldots, V_n$ and as a graph.

FIG. 5 shows a schematic representation of a geographical descriptor model 600 in the form of multiscale node descriptors $G=V_1, V_2, \ldots, V_n$ (left side, wherein only one scale of the multiscale node descriptors is shown for ease of illustration) and as a graph (right side). As illustrated in FIG. 5, in addition to the target location 14 (i.e., the location for which it is to be detected if it is a road intersection or not), further auxiliary locations are sampled in the nearby regions. According to various embodiments the target location and the neighboring locations may be arranged as a grid pattern centered on the target location 14. The auxiliary locations are illustrated in FIG. 5 as eight, at the centers of the shape descriptors around the target point 14, however the disclosure is not necessarily limited to eight, neither to the illustrated arrangement. The geographical data of the trajectories is shown as a series of dots, for illustration purposes.

According to various embodiments, edges are added, for example as elements of adjacent matrix A, the weight of the edges may be set to 1. Edges may correspond to edges (for example, 51 and 52) between vertical and horizontal neighbors to represent the relationship of locations in the geospatial domain. Features are extracted using the shape descriptor at each of the locations (e.g. each of the nine locations) and these features are associated with the corresponding node in the geographical descriptor model. The proposed geographical descriptor model is descriptive and robust as it models the target location together with its local environment, which improves the recognition of intersections.

Figure 6:
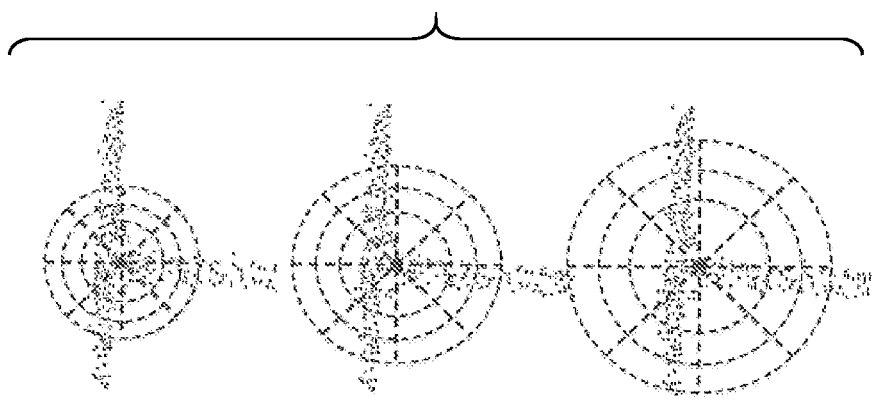
FIG. 6 shows a comparison of shape descriptors $V_1^1$, $V_2^2, \ldots, V_n^m$ of different geographical resolution.

Each of the multiscale shape descriptors is shown in FIG. 5 as a single scale, however each may include shape descriptors of different geographical scale. One example of a multiscale descriptor $V_1^1$ including shape descriptors $V_1^1$, $V_1^2$, ..., $V_1^m$ of different geographical scales and/or resolutions is shown in FIG. 6, which shows m=3 shape descriptors of different scale. The shape descriptors may provide different geographical resolution due to the different bin sizes. The multiscale descriptor $V_1^1$ representation may be applied to the geographical descriptor model, e.g., as shown in FIG. 5. Multiple shape descriptors of different sizes may be used at each location to extract features at different scales. During training, the classifier may learn from the most representative features at each location. As shown in FIG. 6, instead of using one global shape descriptor, three different size shape descriptors may be used, for example with the radius of the inner circle set to 10, 20, and 30 meters, respectively. Thereby, three vectors can be extracted to capture the local distribution of location data (e.g., GPS points) at each location at three different scales, which may next be passed into the trained multiscale classifier where improved classification results can be obtained by applying feature fusion techniques.

Formally, let L denote a set of locations with n samples, and $\tilde{G} = \{G_1, G_2, \ldots, G_n\}$ denote the corresponding geographical descriptor model of locations in L. For each $G_k \in \tilde{G}$, $G_k = \{G_k^1, G_k^2, \ldots, G_k^m\}$ is a set of graphs with the same structure but different scale and/or geographical resolution, and m is the number of different shape descriptors for each multiscale shape descriptor, used for feature extraction. The number m may be an integer equal or greater than 2, for example equal or greater than 3.

According to various embodiments, the geographical descriptor model may include two or more subgraphs ($G_k^1$, $G_k^2$, ... $G_k^m$). Each subgraph ($G_k^1$, $G_k^2$, ... $G_k^m$) may include shape descriptors of a same scale and a same geographical resolution. The scale and/or the geographical resolution of shape descriptors of different subgraphs ($G_k^1$, $G_k^2$, ... $G_k^m$) may be different from each other. Each subgraph ($G_k^1$, $G_k^2$, ... $G_k^m$) may be represented in a corresponding matrix X. Each matrix X may be input into the trained multiscale classifier, for example, together with a corresponding adjacent matrix A. In some embodiments, the distance between nodes of a subgraph, i.e., the distance between center of shape descriptors, may be different among different subgraphs. In some embodiments, the distance between different nodes of a subgraph may not be identical in the same subgraph. Further examples will be described in connection with FIG. 9 below.

The graph convolution network can effectively encode both graph substructures and node vectors of the geographical descriptor model, which is very helpful for multi-graph classification. A compact representation is generated for each input subgraph by concatenating the output features output by the two-layer graph convolutional network, and further fused into a multi-scale graph representation vector, and a classification, for example a binary classification, may be carried out to predict if a given location is a road intersection candidate or not.

Figure 7:
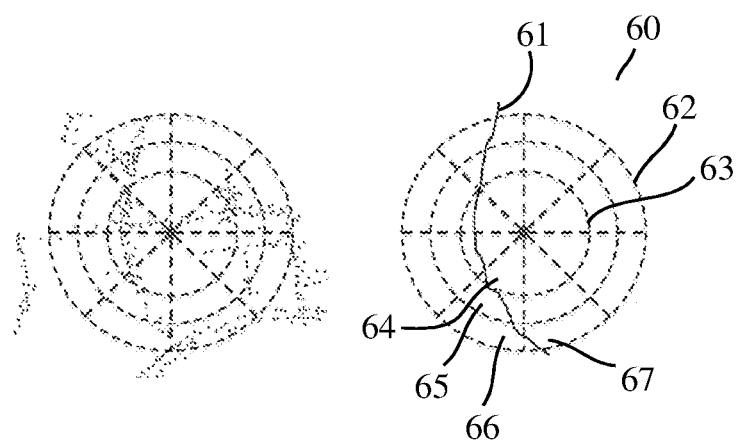
FIG. 7 shows and example of a shape descriptor geographically centered at a geographical perimeter and overlapping location data.

FIG. 7 shows and example of a shape descriptor geographically centered at a target location in a geographical perimeter and overlapping location data. The shape descriptor is illustrated as including concentric circles, such as inner circle 63 and outer circle 62 defining annuli, which are further segmented into bins, for example bins 64, 65, 66, and 67. The geographical data of the trajectories is shown in the form of points on the left side (target locations), and a single trajectory 61 is shown on the right side. FIG. 7 further shows, on the right side, one trajectory 61, selected out of the location data, crossing an inner circle 63 of the shape descriptor 60. Centered at a given location, the shape descriptor 60 divides the nearby regions into multiple histogram bins 64, 65, 66, 67, .... Instead of using all the location data that fall in the nearby regions (see left side of the figure), only trajectories passing through the inner circle of the shape descriptor may be kept and processed to reduce noise. On the right side of FIG. 7, only one of the kept trajectories, namely trajectory 61, is shown, for illustration purposes. For every kept trajectory, one point may be added to each of the bins that the trajectory passes through. The bins may be mapped to a vector which may be further normalized, for example, using the L1 norm.

Similarly, the moving direction may also be quantized by adding points to the respective bins, and map the bins into a moving direction vector, which may be normalized, for example using the L1 norm. The moving direction may be represented as the angle, for example the clock-wise angle, of the device's moving direction with respect to the earth's true north direction.

The vectors that were extracted based on vehicles' locations and moving directions may be concatenated into a single node vector at each location as the location descriptor. Let L denote a set of locations with n samples, and $X = \{X_1, X_2, \ldots, X_n\}$ denote the corresponding normalized descriptors extracted at locations in L. Taking L as the training set, the multiscale classifier may be trained based on the normalized descriptors X to detect if an arbitrary location is a candidate location for a road intersection. Experiments were carried out using 6 circles, 16 angular slices, and 36 moving direction bins. In experiments, the radius of the smallest circle was set to 20 meters, and the ratio between radii of consecutive circles to be 1.3. Surprisingly good results were obtained with this configuration. In various embodiments, the circles ratio between radii of consecutive circles may be chosen, e.g., from 1.1 to 1.6. In various embodiments the radio of the smallest circle may be choses, e.g., from 10 meter to 50 meter. In various embodiments, the angular slices may be chosen, e.g. from 4 to 360 slices.

It was found that neural networks can learn from large-scale real-world GPS trajectories without manually extracting rotation- and scale-invariant features, which may be represented in the form of vectors. Similar to image processing, the training samples from the training data can be further enlarged by applying data augmentation techniques such as rotation to enable the classifier to be capable of recognizing intersections with various orientations. Thus, the methods of the present disclosure addresses potential issues caused by diverse intersection sizes.

Figures 8, 9:
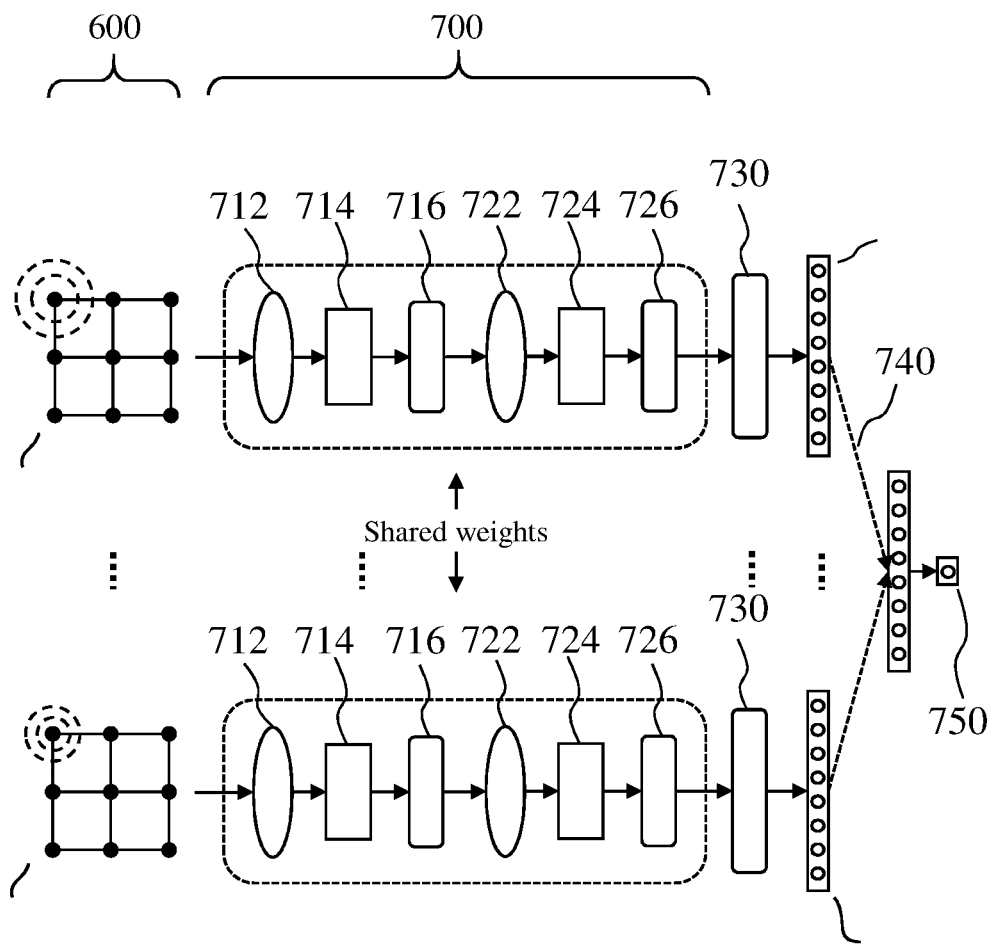
FIG. 8 shows an example of an adjacency matrix for a graph representation (left side)
FIG. 9 shows a schematic representation of a multiscale classifier including the graph convolutional network 700.

FIG. 8 shows an exemplary geographical descriptor model 600 is shown in. Formally, an input graph (see FIG. 8) is represented as G=(V, E, A) (super- and sub-scripts of $G_k^j$ are omitted for presentation simplicity) where V is the set of nodes, E is the set of edges, and A is the adjacency matrix. Let $v_i \in V$ denote a node and $e_{ij}=(v_1, v_j) \in E$ denote an edge. The adjacency matrix A is a 9×9 matrix with $A_{ij}=1$ if $e_{ij} \in E$, which is shown in FIG. 8. An exemplary architecture of the multiscale classifier including the graph convolutional network 700 is illustrated in FIG. 9.

FIG. 9 shows a schematic representation of a multiscale classifier including the graph convolutional network 700. On the left side of FIG. 9, a geographical descriptor model 600 is shown, including subgraphs ($G_k^1$ to $G_k^m$), which may each be represented by a matrix X including node vectors and input into the graph convolutional network 700. The graph convolutional network 700 has inputs for subgraphs of different resolutions ($G_k^1$ to $G_k^m$), the subgraphs are included in the geographical descriptor model 600. The illustrated graph convolutional network 700 includes graph convolutional network (GCN) layers represented by 712 and 722, rectified linear units (ReLu) 714 and 724, and drop outs 716 and 726. The subgraphs of different scales may be processed by the same graph convolution network, for example, inputting each of the m-subgraphs one after another into the graph convolution network (represented by the vertical ellipsis in FIG. 9). Thus, weights are shared for each subgraph. The multi-scale graph representation vector resulting of the graph convolutional network 700 may be concatenated, and further be fused at a stage 740 into a multi-scale graph representation vector.

With the geographical descriptor model 600 including the graph structure and accepting node-level features as inputs into the graph convolutional network 700, a two-layer GCN (for example with graph convolution layers 712 and 714) with ReLU activation (714, 724) and dropout (716, 726) was implemented to obtain a graph-level representation by concatenating node representations. Other architecture variations may be used. Let $\tilde{X}$ represent the node information matrix, the i-th row of which is the vector of node $v_i$. The graph convolution layer takes the following form:

$$Z = f\left(\tilde{D}^{-\frac{1}{2}} \tilde{A} \tilde{D}^{-\frac{1}{2}} \tilde{X} W\right)$$

Where $\tilde{A}=A+I$ is the adjacency matrix of the graph with added self-loops. D is the diagonal degree matrix with $\tilde{D}_{ii}=\Sigma \tilde{A}_{ij}$. W is a matrix of trainable parameters of the graph convolution layer. f( ) is a nonlinear activation function, for which ReLU activation is exemplarily used in the architecture illustrated in FIG. 9. Z is the graph-level feature of the graph convolution layer.

The graph convolution network can effectively encode all (for example two or more) graph substructures including the node features, which is very helpful for multi-graph classification. A compact representation is generated for each input graph by concatenating the output features outputted by the two-layer graph convolutional network into a multi-scale graph representation vector, denoted as $\tilde{Z}_k^j$ corresponding to input graph $G_k^j$.

Figure 10:
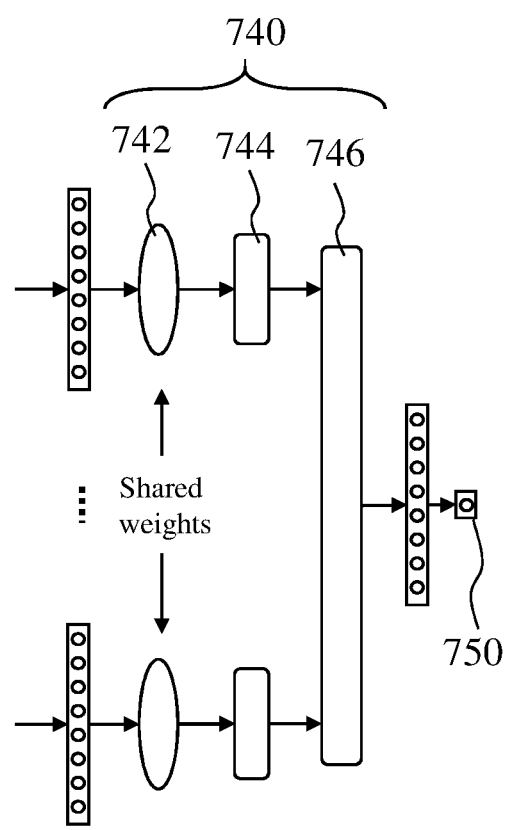
FIG. 10 shows

FIG. 10 is a more detailed schematic representation of the layers of FIG. 9. The multi-scale graph representation vector $\{\tilde{Z}_k^1, \tilde{Z}_k^2, \ldots \tilde{Z}_k^m\}$ encoded at each location $l_k \in L$ may be fused as illustrated in FIG. 10. $\tilde{Z}_k^j$ may be passed to one shared-weight fully-connected layer 742 followed by ReLU activation 744, and the output features may be aggregated, e.g., based on concatenation in a step 746. The output layer 750 of the trained multiscale classifier contains only one unit indicating the probability of the input location being a road intersection or not. A Sigmoid activation may be applied and the binary cross-entropy may be adopted as a loss function.

The present disclosure also relates to a computer program product configured to carry out the method for identifying road intersections according to various embodiments and/or to carry out the method of training the classifier.

The present disclosure also relates to a data processing apparatus configured to carry out the method for identifying road intersections according to various embodiments and/or to carry out the method of training the classifier. The data processing apparatus may include a processor, e.g. a microprocessor, a memory, communication devices, e.g. to enable access to a network.

The present disclosure also relates to a non-transitory computer-readable medium storing computer executable code including instructions for identifying road intersections according to various embodiments. Examples of non-transitory computer-readable medium are a flash memory, a hard disk drive, a CD-ROM, a DVD.

The present disclosure also relates to a non-transitory computer-readable medium storing computer executable code including instructions for training the classifier. Examples of non-transitory computer-readable medium are a flash memory, a hard disk drive, a CD-ROM, a DVD.

The disclosed geographical descriptor model is a multi-scale graph model which is able to extract a general graph-based location descriptor, which can be used for a variety of location-based applications, including, but not limited to, road intersection detection.

In an advanced embodiment of the invention, temporal patterns of vehicle speed are modelled and input into the trained multiscale classifier, for example as part of the node vectors. By modeling the temporal patterns of vehicle speed, it is possible to detect intersections with or without traffic lights. Such information can be used for the estimation of a vehicle's arrival time with improved accuracy.

In another advanced embodiment of the invention, satellite images are used as an additional input for intersection detection. Deep visual representations are be extracted from satellite images using convolutional neural networks. The extracted deep visual representations may be fused with the multi-scale graph representation vectors to better train the multiscale classifier.

While several aspects and embodiments refer to road intersections, the present aspects and embodiments may as well be applied to other kinds of way intersections, for example, bikeways intersections, pedestrian ways intersections, shared use intersections. Shared use may be, e.g., selected from at least two of: bikeways intersections, pedestrian ways intersections, motorized vehicles roads intersections. Thus, the term 'road' as used herein, and in accordance with various embodiments, may also mean a way or a path.

The invention claimed is:

1. A method for identifying road intersections comprising:
   a) providing location data obtained from at least one vehicle's trajectory, wherein the location data comprises geographical data within a geographical perimeter;
   b) determining node vectors by applying a geographical descriptor model on a target location comprised in the geographical perimeter,
      wherein the geographical descriptor model comprises a plurality of multiscale node descriptors comprising a target multiscale descriptor for the target location and neighboring multiscale descriptors for neighboring locations,
      wherein the plurality of multiscale node descriptors comprises at least two shape descriptors of different geographical resolution being used simultaneously,
      wherein each of the neighboring locations is at a respective geographical distance from the target location, and
      wherein the node vectors are respectively determined for each of the plurality of multiscale node descriptors;
   c) inputting the node vectors into a trained multiscale classifier including a graph convolutional network to provide a probability of the target location being a road intersection.

2. The method of claim 1, wherein step c) includes applying a logistic regression, for example, comparing the probability with a pre-determined threshold, and if the threshold is met, for determining that the target location is a candidate location for a road intersection.

3. The method of claim 2, wherein determining node vectors and inputting the node vectors into a trained multiscale classifier is repeated for a plurality of target locations of the location data, to obtain a plurality of candidate locations determined for at least some of the respective plurality of target locations.

4. The method of claim 2, wherein the repetition is carried out by shifting the geographical descriptor model by a shifting geographical distance to a next target location.

5. The method of claim 2, wherein the plurality of candidate locations is clustered to remove duplicates into one or more detected intersections.

6. The method of claim 5, further comprising calculating a mean of one or more trajectories between two detected intersections, to determine the presence of a road between the two detected intersections.

7. The method of claim 1, wherein the target location and the neighboring locations are arranged as a grid pattern centered on the target location.

8. The method of claim 1, wherein the neighboring locations are 8.

9. The method of claim 1, wherein determining node vectors comprises determining a location vector and a moving direction vector for each trajectory of the at least one vehicle's trajectory.

10. The method of claim 9, wherein the location vectors are normalized, and wherein the moving direction vectors are normalized.

11. The method of claim 1, wherein determining node vectors comprises determining a moving direction vector for each trajectory of the at least one vehicle's trajectory.

12. The method of claim 9, wherein determining node vectors further comprises determining a moving direction vector for each trajectory of the at least one vehicle's trajectory, and the method further comprising concatenating each of the location vectors with each of the respective moving direction vectors into concatenated vectors to be input into a trained multiscale classifier as the node vectors.

13. The method of claim 1, wherein each of the shape descriptors divides nearby regions of the target location into multiple histogram bins representing geographical subdivisions, for example each of the shape descriptor may include a circular shape divided in annuli, wherein each of the annuli is split by a radial line into annular sections, each corresponding to histogram bin.

14. The method of claim 13, further comprising discarding trajectories which do not cross a pre-determined inner circle of the shape descriptor, for example a circle formed by the inner annuli, for reducing noise.

15. The method of claim 13, wherein determining a location vector comprises performing binning of the trajectory, for example, by adding one point to each of the histogram bins that the trajectory passes through.

16. The method of claim 13, herein determining a moving direction vector comprises, for a plurality of geographical angular rotations of the shape descriptor in a pre-determined geographical angular direction, performing binning of a moving direction of the location data of the trajectory, for example, by adding one point to each of the histogram bins for which the location data of a trajectory is a moving direction.

17. A data processing apparatus comprising:
   a memory for storing instructions for identifying road intersections; and
   a processor configured to carry out a method for identifying the road intersections comprising:
   a) providing location data obtained from at least one vehicle's trajectory, wherein the location data comprises geographical data within a geographical perimeter;
   b) determining node vectors by applying a geographical descriptor model on a target location comprised in the geographical perimeter,
      wherein the geographical descriptor model comprises a plurality of multiscale node descriptors comprising a target multiscale descriptor for the target location and neighboring multiscale descriptors for neighboring locations,
      wherein the plurality of multiscale node descriptors comprises at least two shape descriptors of different geographical resolution being used simultaneously,
      wherein each of the neighboring locations is at a respective geographical distance from the target location, and
      wherein the node vectors are respectively determined for each of the plurality of multiscale node descriptors; and
   c) inputting the node vectors into a trained multiscale classifier including a graph convolutional network to provide a probability of the target location being a road intersection.

18. The data processing apparatus according to claim 17, wherein step c) includes applying a logistic regression, for example, comparing the probability with a pre-determined threshold, and if the threshold is met, for determining that the target location is a candidate location for a road intersection.

19. The data processing apparatus of claim 18, wherein determining node vectors and inputting the node vectors into a trained multiscale classifier is repeated for a plurality of target locations of the location data, to obtain a plurality of candidate locations determined for at least some of the respective plurality of target locations.

20. A method for training a classifier for determining if a target location is a road intersection, the method comprising:
- performing forward propagation by inputting training data into a classifying logic to obtain an output result, for a plurality of target locations of a geographical perimeter, wherein the training data comprises:
  - location data obtained from at least one vehicle's trajectory, wherein the location data comprises geographical data within the geographical perimeter, and
  - intersection presence data for each target location of a plurality of target locations;
- performing back propagation according to a difference between the output result and the known intersection presence data to adjust weights of the classifying logic; and
- repeating the above steps until a pre-determined convergence threshold is achieved,
- wherein the classifying logic comprises a classifier comprising a graph convolutional network and a pre-processing logic for determining node vectors by applying a geographical descriptor model on a target location comprised in the geographical perimeter,
- wherein the geographical descriptor model comprises a plurality of multiscale node descriptors comprising a target multiscale descriptor for the target location and neighbouring multiscale descriptors for neighbouring locations,
- wherein the plurality of multiscale descriptors comprises at least two shape descriptors of different geographical resolution being used simultaneously,
- wherein each of the neighboring locations is at a respective geographical distance from the target location, and
- wherein the node vectors are respectively determined for each of the plurality of multiscale node descriptors.

* * * * *